(12) United States Patent
Parker et al.

(10) Patent No.: US 7,248,770 B2
(45) Date of Patent: Jul. 24, 2007

(54) PHOTONIC BAND STRUCTURE DEVICES

(75) Inventors: Greg Parker, Hampshire (GB); Martin Charlton, Southampton (GB); Majd Zoorob, Southampton (GB); Simon James Cox, Southampton (GB)

(73) Assignee: Mesophotonics Limited, Southampton (GB)

( * ) Notice: Subject to any disclaimer, the term of this patent is extended or adjusted under 35 U.S.C. 154(b) by 212 days.

(21) Appl. No.: 10/878,019

(22) Filed: Nov. 4, 2003

(65) Prior Publication Data

US 2005/0094956 A1 May 5, 2005

(51) Int. Cl.
*G02B 6/10* (2006.01)
(52) U.S. Cl. ..................................... 385/129
(58) Field of Classification Search ............... None
See application file for complete search history.

(56) References Cited

U.S. PATENT DOCUMENTS

| 5,828,492 A * | 10/1998 | Moser et al. | 359/575 |
| 2001/0012149 A1* | 8/2001 | Lin et al. | 359/344 |
| 2002/0191933 A1* | 12/2002 | Tokushima | 385/129 |
| 2003/0068114 A1* | 4/2003 | Link et al. | 385/14 |
| 2003/0068152 A1* | 4/2003 | Gunn | 385/129 |
| 2003/0202764 A1* | 10/2003 | Lee et al. | 385/129 |
| 2004/0264903 A1* | 12/2004 | Dridi et al. | 385/129 |

FOREIGN PATENT DOCUMENTS

JP 11-218627 A * 8/1999 ................... 385/14

* cited by examiner

Primary Examiner—Rodney Bovernick
Assistant Examiner—Mike Stahl
(74) Attorney, Agent, or Firm—Nixon & Vanderhye P.C.

(57) ABSTRACT

The invention provides a photonic structure comprising a first region (3) formed from a material having a first refractive index; and an array of sub-regions (5) formed in the first region, each sub-region having a refractive index different to the first refractive index;

wherein the array of sub-regions (5) can be defined by a plurality of rows and columns, wherein the position of each sub-region relative to adjacent sub-regions in each row and the properties of the sub-regions across each row are defined by parameters of a first type, and the position of each row relative to adjacent rows, and the properties of the sub-regions along each column are defined by parameters of a second type; and wherein at least one parameter of a first type and at least one parameter of the second type is varied systematically and independently across the array.

The present invention gives rise to structures with photonic band structures that can be tailored to a particular application. A variation in the first type of parameter has a different effect to a variation in the second type of parameter. Variation in a first type of parameter alters the diffracting properties of each row in the stack of rows. Variation in a second type of parameter affects the reflective properties of the structure.

According to another aspect of the invention, a method for manufacturing photonic structures is provided including a computer optimisation process in the design stage.

9 Claims, 15 Drawing Sheets

PHOTONIC BAND STRUCTURE DEVICES

FIELD OF THE INVENTION

The present invention relates to a photonic band structure device. In particular, the present invention relates to planar waveguide structures incorporating photonic band structures and the design of such structures.

BACKGROUND TO THE INVENTION

Photonic band structure devices may be incorporated in a range of different optical systems to provide optical signal processing. In particular, photonic band structures incorporated in planar waveguide structures provide a range of functions in integrated optical circuitry or in telecommunications systems. This type of photonic band structure can also be used in other applications such as biosensors and optical data storage systems.

WO 98/53351 filed by BTG International Limited provides a detailed description for photonic band structures in planar waveguides. The photonic band structure is provided by a lattice of sub-regions embedded in a background region. Initially the sub-regions were simply holes etched into a dielectric waveguide. Developments in the field have led to the formation of sub-regions of one dielectric material being used in a background region of a different dielectric material. This is described in co-pending U.S. patent application Ser. No. 10/196,727, filed by Mesophotonics Limited.

The properties of the photonic band structure, i.e. the optical response, determines its usefulness for a particular function. The photonic band structure is dependent on a number of independent factors, such as the geometry of the array of sub-regions, the geometry of each sub-region and the materials used. Photonic band structures can be designed so that bandgaps or band edges occur at particular wavelengths, but often these structures suffer from undesirable properties away from a particular wavelength for which it was designed. In particular, for a finite length of photonic band structure, Fabry-Perot resonances can form close to the band edges.

For devices for use in systems carrying multiple wavelengths or switching devices using a change in the photonic band structure this can lead to a severe loss of performance.

The present invention aims to provide a more flexible photonic band structure which can be tailored to meet the demands of a particular optical application.

SUMMARY OF THE INVENTION

According to a first aspect of the present invention, a photonic structure comprises:

a first region formed from a material having a first refractive index; and an array of sub-regions formed in the first region, each sub-region having a refractive index different to the first refractive index;

wherein the array of sub-regions forms a plurality of rows and columns, wherein the position of each sub-region relative to adjacent sub-regions in each row and the properties of the sub-regions across each row relative to the properties of adjacent rows are defined by parameters of a first type, and the position of each row relative to adjacent rows, and the properties of the sub-regions along is each column are defined by parameters of a second type; and wherein at least one parameter of a first type and at least one parameter of the second type varies systematically across the array, the at least one parameter of the first type varying independently of the at least one parameter of the second type.

The present invention gives rise to photonic band structures that can be tailored to a particular application. A variation in the first type of parameter has a different effect to a variation in the second type of parameter. In a simplistic view, variation in a first type of parameter alters the diffracting properties of each row in a stack of rows and variation in a second type of parameter affects the reflective properties of the structure. In reality the effect of the variation in one parameter can never be totally isolated and one variation will always interact with another to alter the optical properties of the structure as a whole.

The invention requires one parameter from a first group of parameters to be varied and one parameter from a second, different group of parameters to be varied.

Systematic variation is variation according to some simple function or combination of simple functions. For example the spacing of the sub-regions might increase linearly across the array, or the spacing might vary according to a sinusoidal function. In essence, the sub regions are arranged in a basic lattice structure of some sort which has been manipulated. The array can still be defined by a pair of bases corresponding to the rows and columns.

Independent variation of a first type of parameter and a second type of parameter excludes a variation of a single parameter which equates to variation in a first type of parameter and variation in a second type of parameter. An example of this is variation in the spacing between sub-regions in a direction oblique to both the rows and the columns defining the lattice. This type of variation will result in a first variation in the spacing between sub-regions within each row across the array and a second variation in the spacing between rows across the array, i.e. a variation in a first type of parameter and a variation in a second type of parameter. However, the first and second variations are not independent of one another as they are the result of a single variation in another direction.

Across the array means over the extent of the array in a direction non-parallel to the rows.

In use, optical signals are incident on the photonic structure non-parallel to the rows, i.e. having some component of its propagation direction parallel to the columns. The optical signals are then diffracted by each row of sub-regions in turn and are also multiply reflected and transmitted by each row in dependence on the wavelength(s) of the optical signal.

The parameters may be varied continuously or discontinuously across the array i.e. according to a continuous function or a discontinuous function. Preferably, the properties of the sub-regions include size, shape and refractive index.

Preferably, the positions of sub-regions relative to adjacent sub-regions or the properties of the sub-regions are varied systematically across at least one row.

Preferably, the photonic structure is part of a planar waveguide structure. The planar waveguide structure preferably comprises a core layer and a cladding layer, wherein the array of sub-regions is formed in the core layer or the cladding layer or in both. This allows the photonic band structure to be easily integrated into existing optical systems.

The sub-regions may have a lower refractive index to the first region, but preferably the sub-regions each have a refractive index higher than the first refractive index. This reduces losses out of the photonic band structure out of the plane of the waveguide.

According to a second aspect of the present invention, an optical device comprises:
an optical input;
a photonic structure coupled to the optical input; and
an optical output coupled to the photonic structure;
wherein the photonic structure is a photonic structure according to the first aspect of the invention.

Preferably, the optical input and optical output are coupled to the photonic structure so that the optical signals from the optical input propagate through the photonic band structure in a direction perpendicularto the rows of sub-regions in order to reach the output. However, the photonic band structure may be rotated relative to the optical input and/or optical output to provide a further level of flexibility to the device. By looking at the photonic band diagram it can be seen which dispersion mode optical signals will couple into dependent on the particular direction of propagation of optical signals through the structure, and hence what signal processing optical signals will undergo.

Preferably, the optical input is coupled to an input facet of the photonic is structure and the optical output is coupled to an output facet of the photonic structure, wherein the input facet and/or the output facet is oblique to the direction of propagation of optical signals passing from the optical input to the optical output. The oblique input and output facets exploit refraction to provide further signal processing.

This provides a means of generating prism like compact photonic structures. The prism like shape can be designed to enhance the refractive properties of the structure and provides angular separation of different wavelengths which experience strong dispersive behaviour. This can be beneficial in the generation of tailored compact super-prism structures for efficient wavelength multiplexing (WDM), dispersion compensation and for time delay applications.

According to a third aspect of the present invention, a method of manufacturing a photonic structure comprising a first region formed from a material having a first refractive index, and an array of sub-regions formed in the first region, each sub-region having a refractive index different to the first refractive index, wherein the array of sub-regions is defined by a plurality of parameters, comprises the steps of:
(a) defining objective properties of a photonic band structure to be achieved;
(b) modelling a basic photonic structure including an array of sub-regions on a computer and determining its photonic band structure;
(c) selecting two or more parameters defining the array;
(d) systematically varying the selected parameters across the array to provide a new photonic structure;
(e) determining the photonic band structure of the new photonic crystal structure;
(f) comparing the photonic band structure of the new photonic crystal structure with the objective properties defined in step (a), and assigning a figure of merit to the new photonic structure based on the comparison;
(g) repeating steps (d) to (f) a plurality of times to obtain a figure of merit for a plurality of photonic structures; and
(h) selecting a photonic structure from the plurality of photonic structures based on the figure of merit data of step (g); and
(i) fabricating the selected photonic structure.

This method provides a means of designing and producing an optical device for a particular application quickly and simply. The same method is applicable for any desired characteristics. It allows photonic band structures to be designed for particular applications without the expense of producing many alternative prototypes and will allow bespoke structures to be produced at low cost.

Preferably, having selected a photonic structure in step (h), the method further includes the step of selecting at least one further parameter defining the array; and
systematically varying the further parameter across the array to tune a photonic band structure of the photonic structure.

This further refines the photonic band structure for a particular application. The same design process can be applied many times over, varying different parameters each time to ensure an optimum design is reached.

Preferably, the array of sub-regions forms a plurality of rows and columns;
wherein the position of each sub-region relative to adjacent sub-regions in each row and the properties of the sub-regions across each row are defined by parameters of a first type;
the position of each row relative to adjacent rows and the properties of the sub-regions along each column are defined by parameters of a second type; and
wherein the parameters selected in step (c) comprise at least one parameter of the first type and at least one parameter of the second type.

Preferably, the basic photonic structure has a square or triangular lattice of sub-regions. However, any 2-dimensional array could be used as a starting point For example, quasicrystals having higher symmetry, as described in WO 01/77726 (filed by BTG International Limited, could be used.

BRIEF DESCRIPTION OF THE DRAWINGS

Examples of the present invention will now be described in detail with reference to the accompanying drawings, in which.

DETAILED DESCRIPTION

Figure 1:
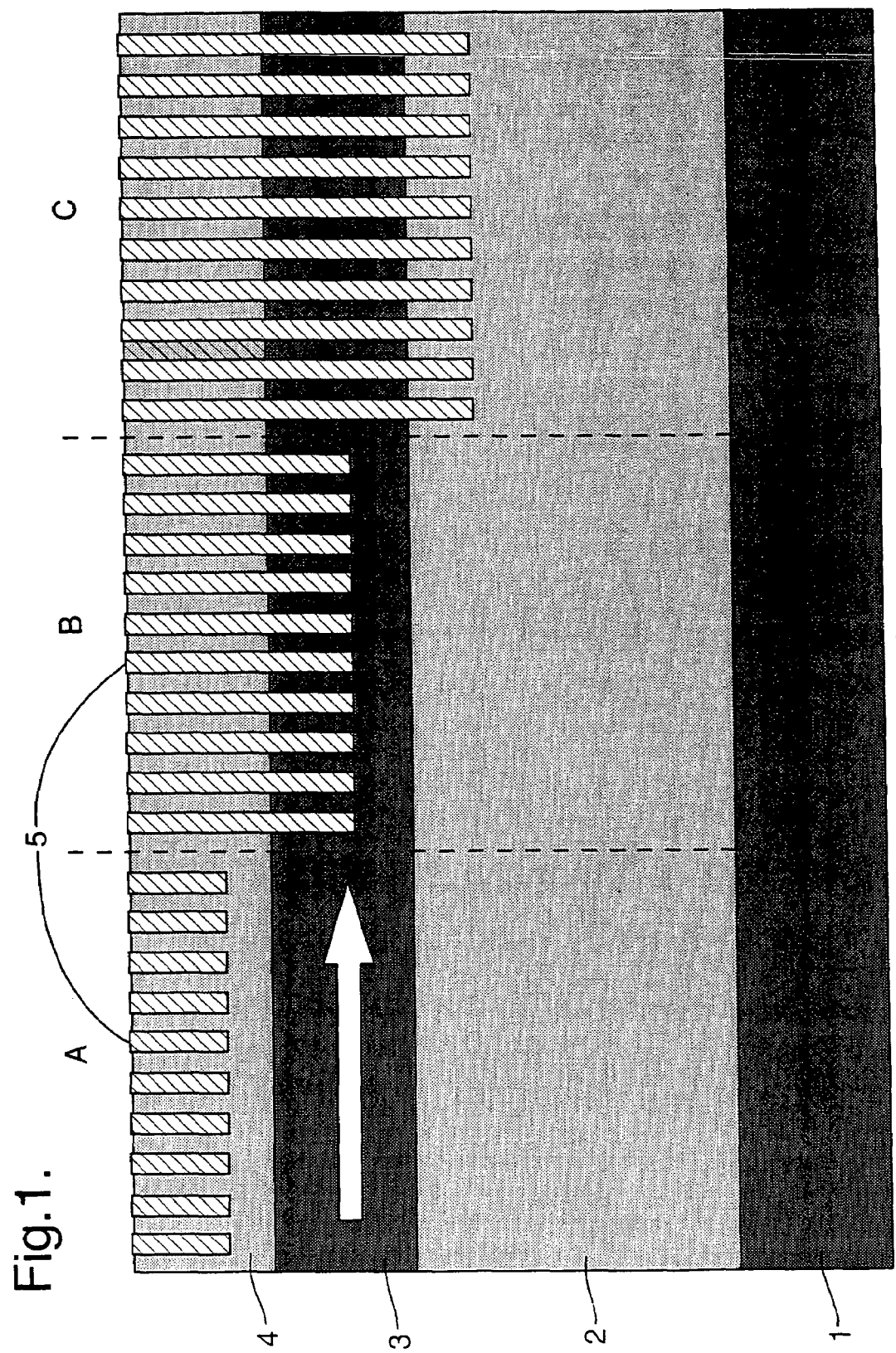
FIG. 1 shows a cross-section of a planar waveguide with a photonic band structure formed therein, with three alternative arrangements shown.

Photonic crystal structures of the type to which the present invention relates are described in WO 98/53351. FIG. 1 shows such a structure in cross-section.

The structure comprises a substrate 1, a buffer layer 2, a core layer 3 and a cladding layer 4. In fact FIG. 1 shows three different embodiments of these types of structure. They are two-dimensional photonic crystal structures formed in a planar waveguide. The photonic crystal is formed from an array of sub-regions 5 etched into the waveguide. As shown in FIG. 1, these sub-regions can be formed in the cladding only (section A), they can be formed in the core (section B) or they can be formed in the buffer layer (section C) or any combination of these three. This gives rise to a periodic dielectric structure which is experienced by an optical signal propagating down the waveguide. This is fully described in co-pending U.S. patent application Ser. No. 10/421949 filed by Mesophotonics Limited.

WO 98/53351 describes periodic dielectric structures that give rise to a photonic band structure analogous to the electronic band structure of semiconductor devices. The photonic band structure for a periodic dielectric structure can be determined by solving the wave equation in three dimensions.

Figure 2:
FIG. 2 shows a conventional photonic crystal.

Typically, the two-dimensional periodic structure consists of a regular array of sub-regions. The simplest regular two-dimensional arrays are square and triangular lattices. These regular lattices can provide strong band gaps. A square lattice is shown in FIG. 2 in plan view with rectangular sub-regions 10 forming the lattice.

The properties of photonic crystals are dependent on a number of independent parameters defining the photonic crystals. These are the geometry of the array, the geometry of the sub-regions forming the array, the materials used (specifically their refractive indices), the dimensions of each of the sub-regions and the size of the array as a whole. The finite size of any real array structure in particular means a departure from an "ideal" photonic band structure. Fabry-Perot resonances can occur at the band edges, and given that many of the most useful applications of these structures use the band edges, these resonances are undesirable.

In order to understand the present invention it is helpful to think of the array of sub-regions of the photonic crystal as consisting of a plurality of rows of sub-regions. With optical signals propagating perpendicular to the rows, as shown by arrow 20 in FIG. 3a, the rows of sub-regions may be thought of as individual gratings stacked together. The parameters defining the array can be of a first type relating to the properties of each diffraction grating i.e. determining the properties of the sub-regions along each row, or can be of a second type relating to the properties of the stack, i.e. the properties of the sub-regions in a direction perpendicular to each row. Examples of the first type of parameter are the spacing between sub-regions in each row and the width of each sub-region. Examples of the second type of parameter are the spacing between rows and the thickness of the sub-regions in each row.

Figure 3A:
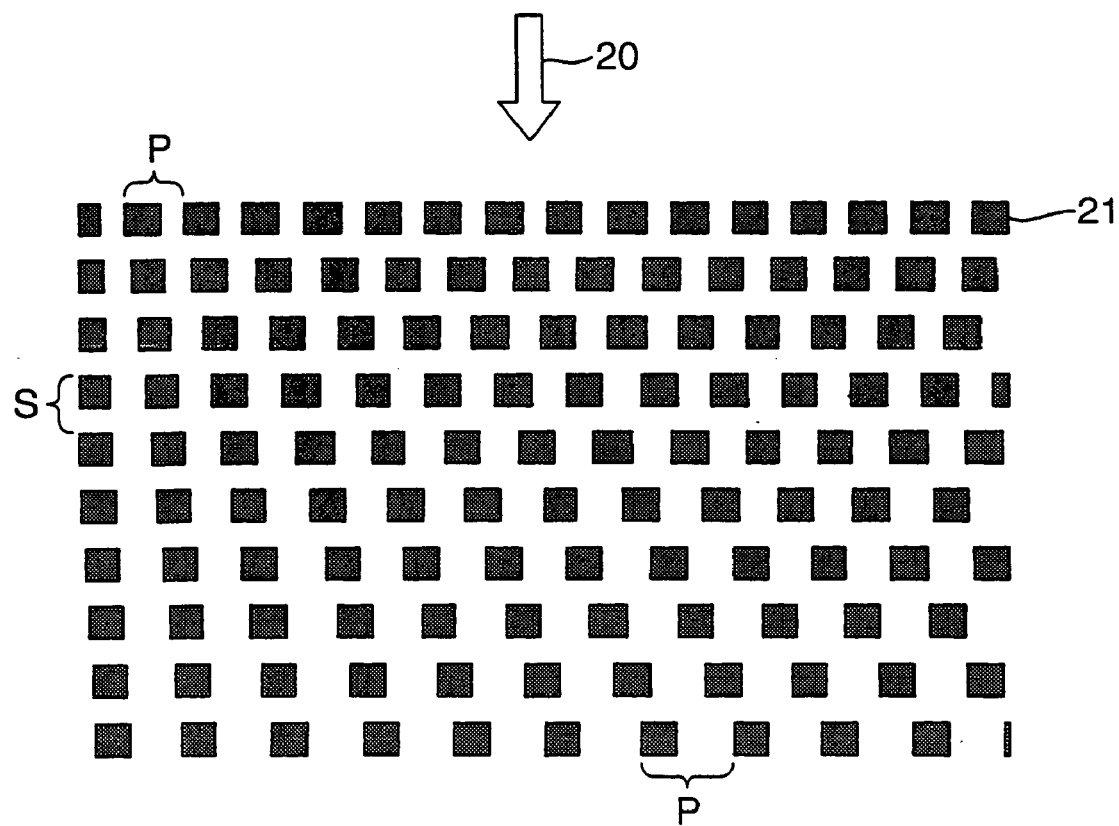
FIGS. 3a-3d illustrate the type of parameters that can be varied across an array.
Figure 3B:
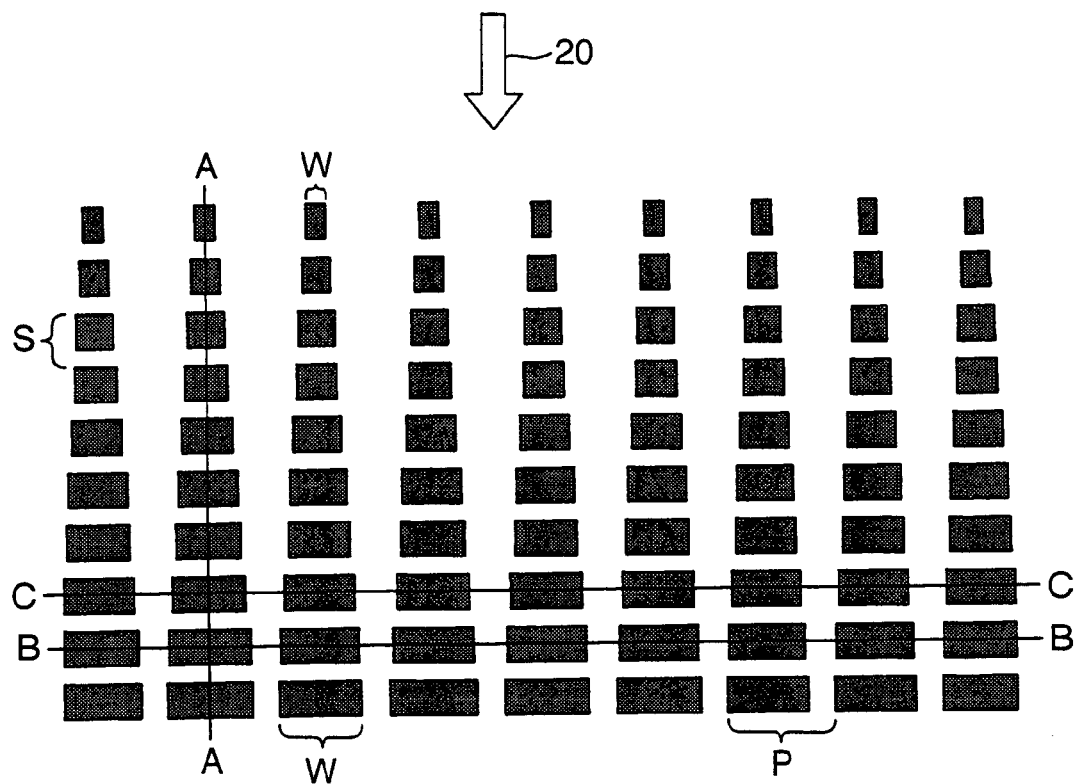
Figure 3C:
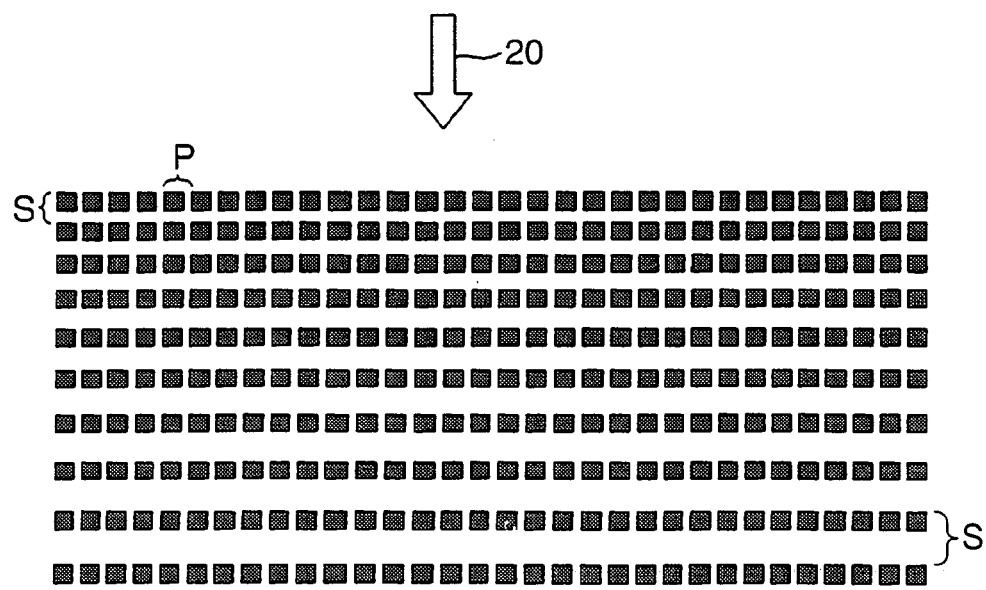
Figure 3D:
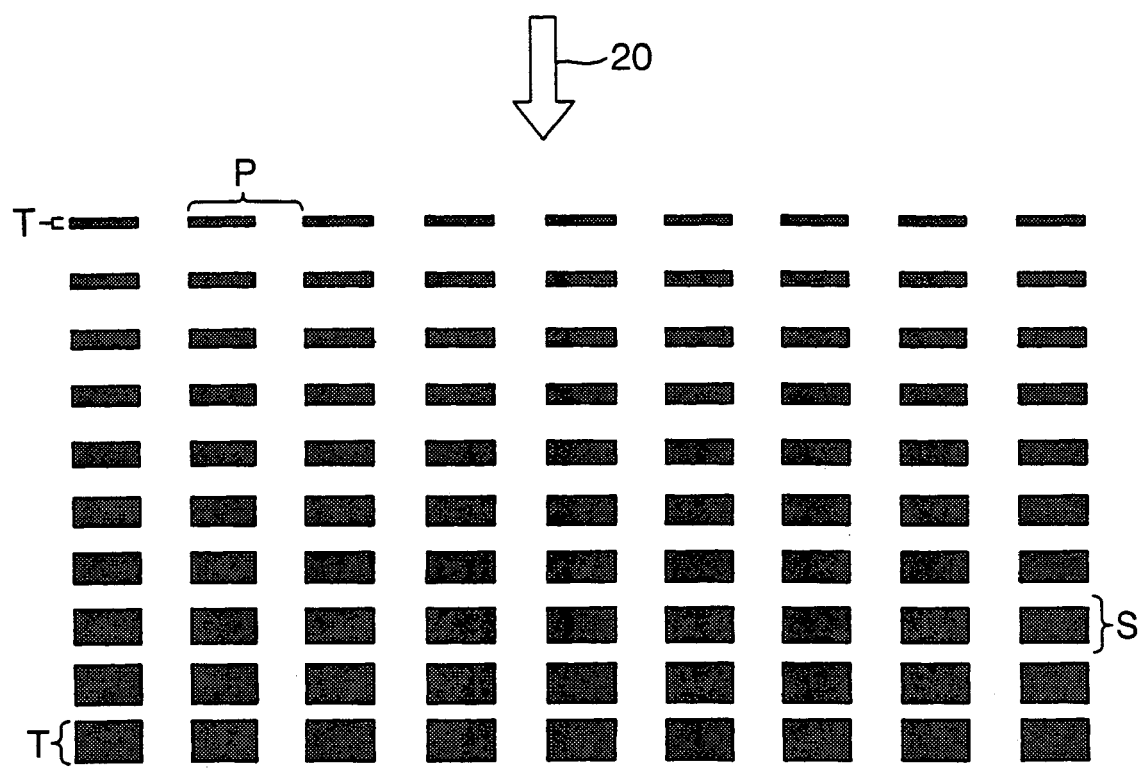

The present invention requires a systematic variation across the array for both a parameter of the first type and a parameter of the second type. FIG. 3 shows examples of systematic variation across the array of a single parameter only. The arrangements shown in FIG. 3 therefore, fall outside the scope of the present invention. FIG. 3A shows an example of an array of sub-regions 21 in which a parameter of the first type, i.e. the periodicity of the rows (indicated as P), is varied across the array. The spacing between rows (indicated as S) remains constant. The array is based on a square lattice. FIG. 3B shows another parameter of the first type, the width of the slabs (W), which is varied across the array. FIGS. 3C and 3D show examples of variation of parameters of the second type, i.e. the spacing between rows (S) and the thickness of the sub-regions (T), which are varied systematically across the array. In each case the direction of propagation of the light is indicated by arrow 20. To better illustrate the to types of parameter, looking along the line A-A in FIG. 3B it can be seen that there is a regular structure in that direction, i.e. no variation in the second type of parameter. However, looking along the lines B-B and C-C it can be seen that there is a difference in the structure between adjacent rows. A difference in the structure between adjacent rows is indicative of a variation in a first type of parameter.

Figure 4:
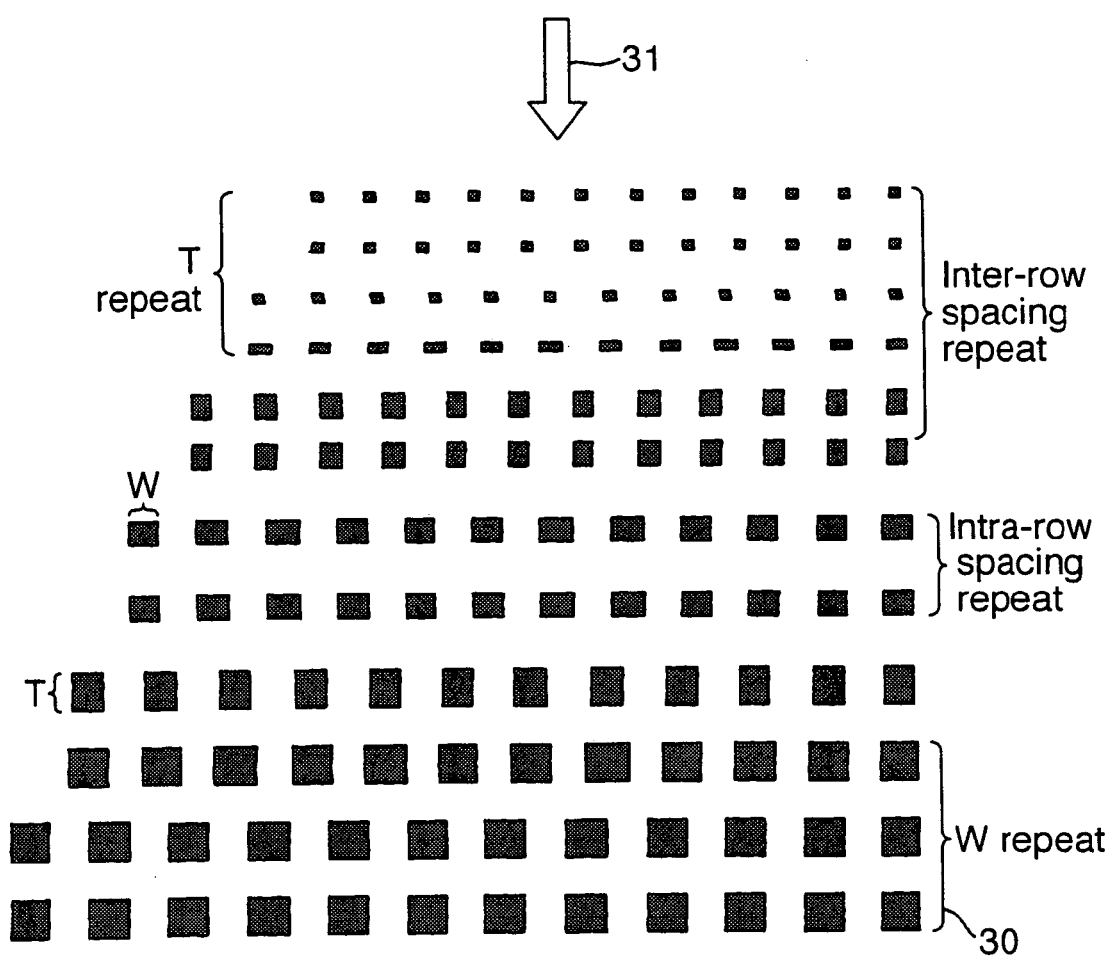
FIG. 4 shows a first example of a photonic structure according to the present invention.

FIG. 4 shows schematically an example of a photonic crystal structure according to the present invention. The array of sub-regions 30 of FIG. 4 is based on a square lattice and includes both a variation in a parameter of the first type and a variation in a parameter of the second type. The variation does not have to be a continuous, smooth gradation across the lattice. As can be seen from FIG. 4, the variation can be made step-wise e.g. repeating four identical rows at a time for the thickness of the sub-regions. This is an example of a discontinuous variation.

Looking at FIG. 4 in more detail it can be seen that there are four parameters varied across the array. Light propagates through the array in a direction perpendicular to the rows, as indicated by the arrow 31. The sub-regions 30 are rectangular and have a thickness T, which is their dimension in the direction of the columns, and a width W, which is their dimension in the direction of the rows. The thickness of the sub-regions is varied across the array according to a step function.

Every four rows in the direction of light propagation the thickness of the sub-regions is increased (this is indicated by "T repeat" in FIG. 4). Similarly, every three rows the width of the sub-regions is increased. The spacing or period of the rows (inter-row spacing) and the spacing of the sub-regions within the rows (intra-row spacing) is also varied across the array according to step functions. The inter-row spacing is increased every six rows across the array. The intra-row spacing is increased every two rows across the array.

FIG. 4 shows a lattice of twelve rows, each row having twelve sub-regions. The thickness and width of the sub-regions range from 50 nm (first sub-region) to 200 nm (last sub-region). The inter-row spacing ranges from 260 nm to 390 nm. The intra-row spacing ranges from 260 nm to 390 nm.

Variation in the first type of parameter has a different effect to variation in the second type of parameter. If the optical effect of variation in the first type of parameter and second type of parameter could be separated then variation in a first type of parameter would alter the diffracting properties of each row in the stack of rows and variation in a second type of parameter would alter the reflective properties of the structure. This is an oversimplification of a complex situation but is a useful guide in designing a structure for a particular purpose.

Figure 5:
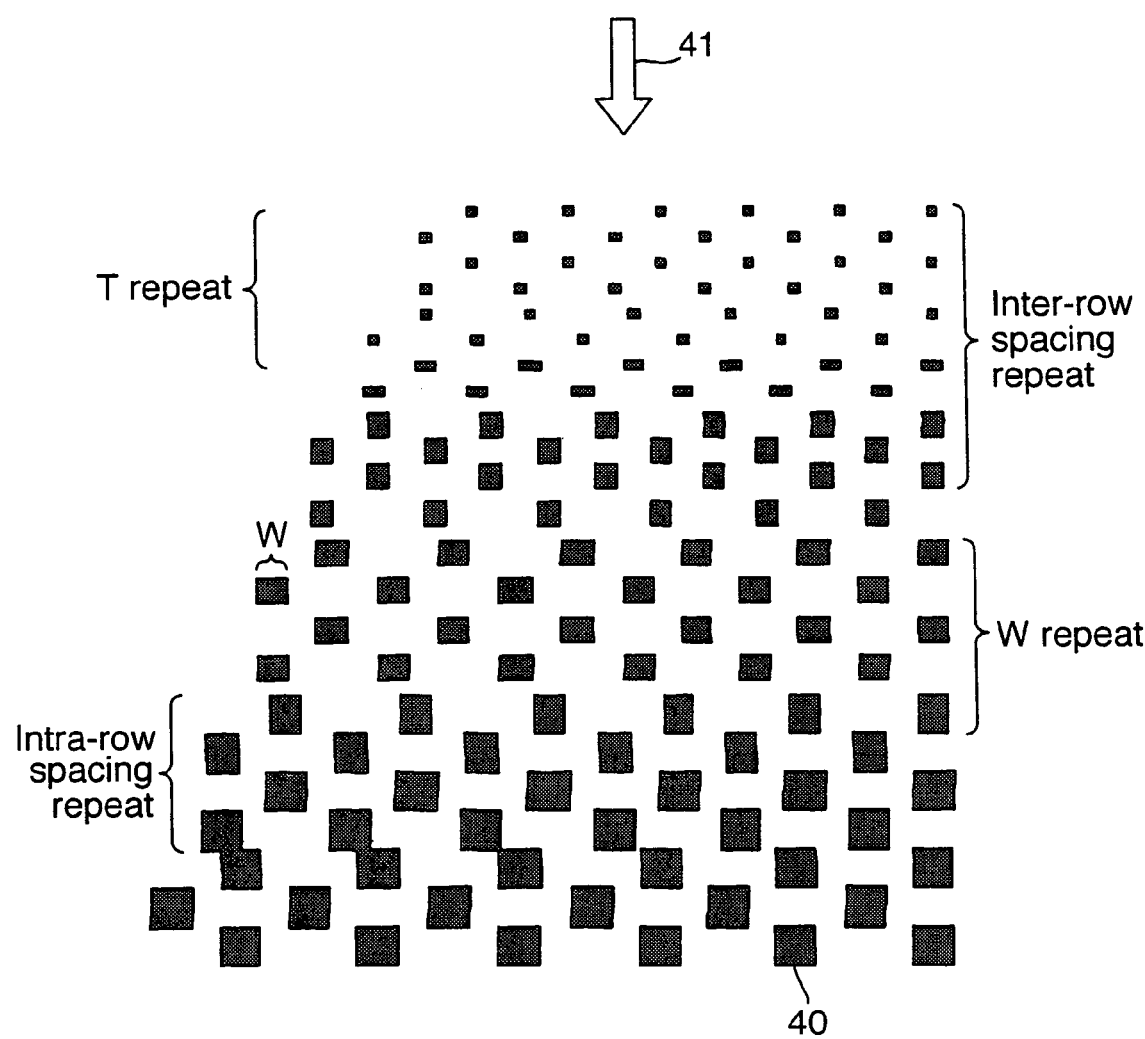
FIG. 5 shows a second example of a photonic structure according to the present invention.

FIG. 5 shows another example of a photonic structure in accordance with the present invention. The array shown in FIG. 5 is based on a triangular lattice. As with the array shown in FIG. 4, there are four parameters varied across the array, two of the first type and two of the second type. The sub-regions 40 are rectangular with their thickness increased every four rows and their width increased every three rows, where one row consists of a zig-zag of twelve sub-regions, i.e. two offset lines of sub-regions which would then be repeated in a regular triangular lattice. The inter-row spacing is increased every six rows and the intra-row spacing is increased every two rows. The unit cell of the lattice can be thought of as containing two sub-regions. A component of light propagates in the direction of arrow 41.

Figure 6:
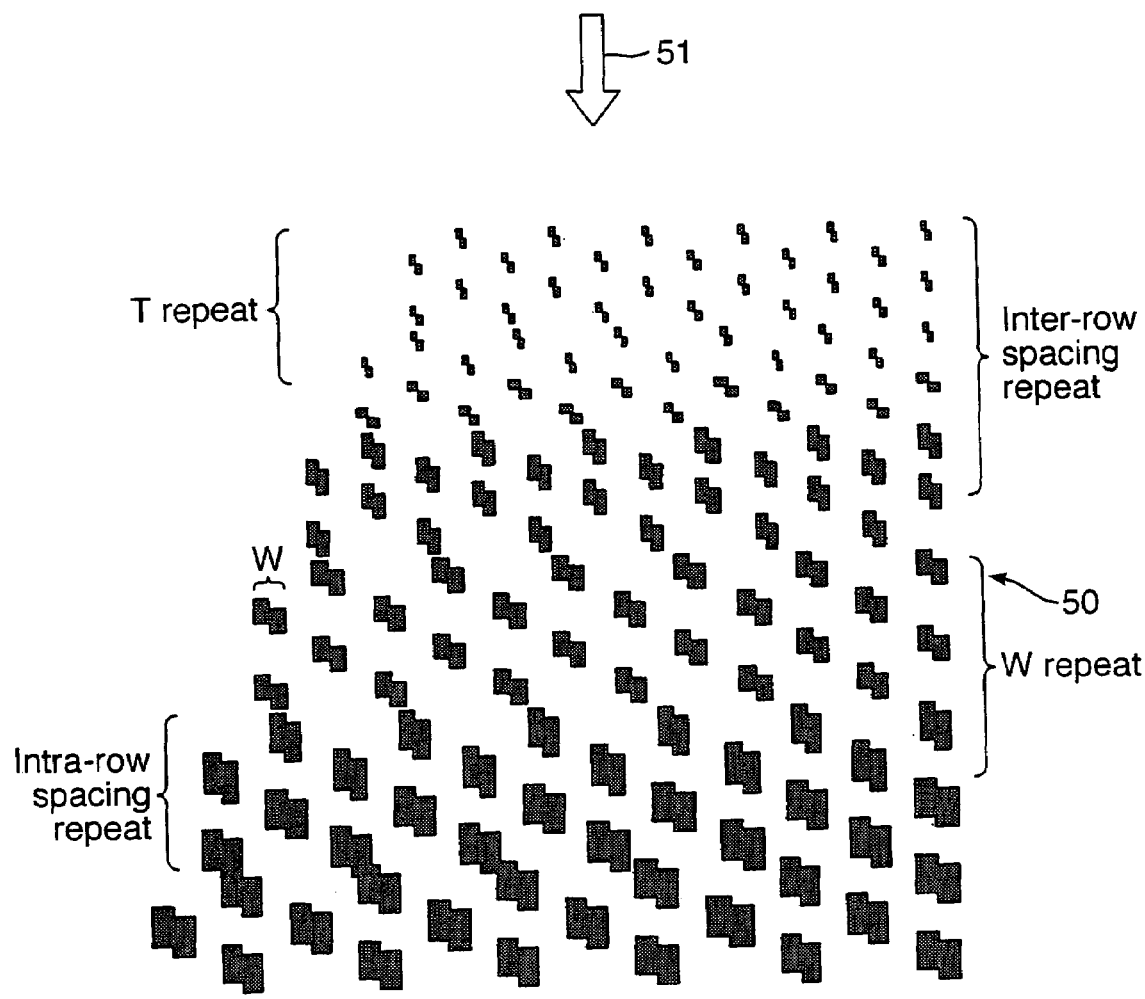
FIG. 6 shows a third example of a photonic structure according to the present invention.

FIG. 6 shows a variation on the array shown in FIG. 5. The array shown in FIG. 6 has the same parameters varied as the array of FIG. 5 but each of the sub-regions 50 is split and the two halves shifted relative to one another in the direction of the columns. This can provide unique modal properties, where breaking the symmetry of the array provides increased polarisabon sensitivity. Thus structures of this type may be beneficial in the design of compact polarisabon splitters. Again a component of light propagates in the direction of arrow 51.

In fact, by independent variation of both one or more parameters of a first type and one or more parameters of a second type the optical response of the structure can be tailored to suit a particular application.

The following is a list of possible parameters that might be altered:
the refractive index of sub-regions
the refractive index of the background region
the shape of the sub-regions, e.g. rectangles or ellipses (including squares and circles)
the type of lattice, e.g. square or triangular
even spacing in a graded array for a triangular lattice (in a triangular lattice each lattice point consists of two sub-regions which, in a graded array, can either be in constant registration with each other or graded across the array in the same manner as the lattice points)
the number of rows
the number of columns
the thickness of a first sub-region
the thickness of a last sub-region
intra-row spacing of the sub-regions
inter-row spacing of the sub-regions
the grading of the intra-row spacing
the grading of the inter-row spacing
the width of first sub-region
the width of last sub-region
the number of rows to repeat with identical inter-row periodicity
the number of rows to repeat with identical intra-row periodicity
the number of rows to repeat with identical width sub-regions
the number of rows to repeat with identical thickness sub-regions
the angle of an input facet or an output facet
the rotation angle of the array
the phase shift within each element
introduction of a second medium in the sub-regions Each of these parameters is associated with a particular optical property of a structure. As stated above, broadly speaking, variation in the first type of parameter affects the diffractive properties of the array and variation in a second type of parameter affects the reflective properties of the array.

Figure 7:
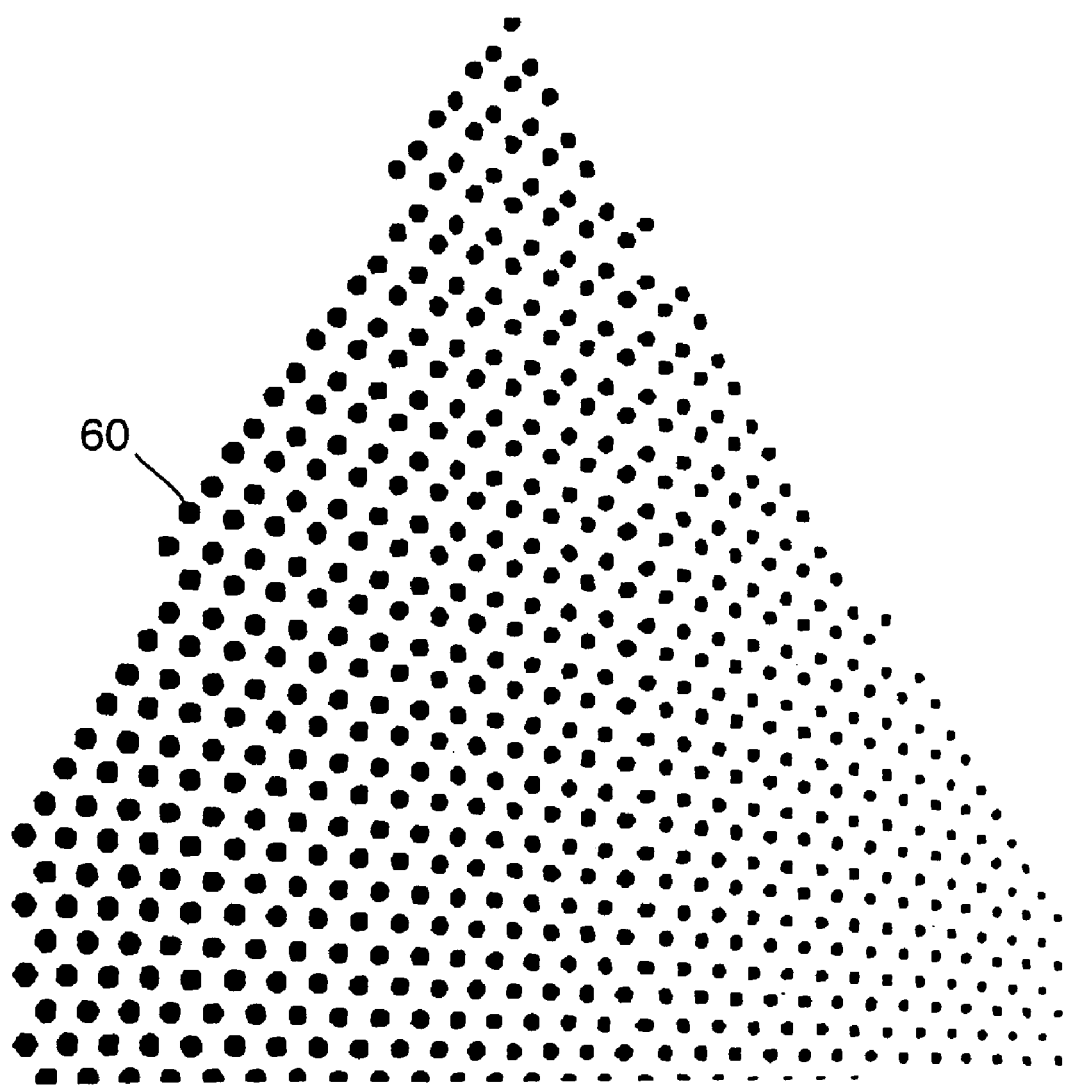
FIG. 7 shows a fourth example of a photonic structure according to the present invention

The introduction of rotation angles to the lattice pattern can be used to provide improved accuracy in coupling optical signals in specific dispersion modes. The rotation angle refers to the orientation of the lattice with respect to input or output waveguides. Furthermore, the start and finish angles of the structure provide a means of generating prism-like compact photonic structures. This is illustrated in FIG. 7. FIG. 7 shows a lattice of circular sub-regions 60. The lattice is based on a triangular lattice consisting of 20 rows and 20 columns. The diameter (i.e. both thickness and width) of the sub-regions is varied from 50 to 150 nm across the array. Both the inter-row and intra-row spacing is graded across the array in the same manner. The input and output facet angle is 30°. The prism like shape enhances the refractive properties of the structure and provides angular separation of different wavelengths which experience strong dispersive behaviour. This can be beneficial in the generation of compact super-prism structures for efficient wavelength multiplexing (WDM), dispersion compensation and for time delay applications.

Grading of the width of the sub-regions from row to row helps to eliminate Fabry-Perot resonances in the long wavelength side of reflective band edges. This can be very useful for filtering applications, similar to chirped grating applications. It is best explained by viewing each row as a diffraction grating and thus the array as a stack of diffraction gratings. Each row has the same intra-row spacing, but a different filling fraction. The array works by each row diffracting light at a slightly different efficiency. This means that the side lobes and diffraction peaks are smoothed out over the course of the array and can be eliminated as compared to a stack of gratings with each row having the same filling fraction.

Figure 8A:
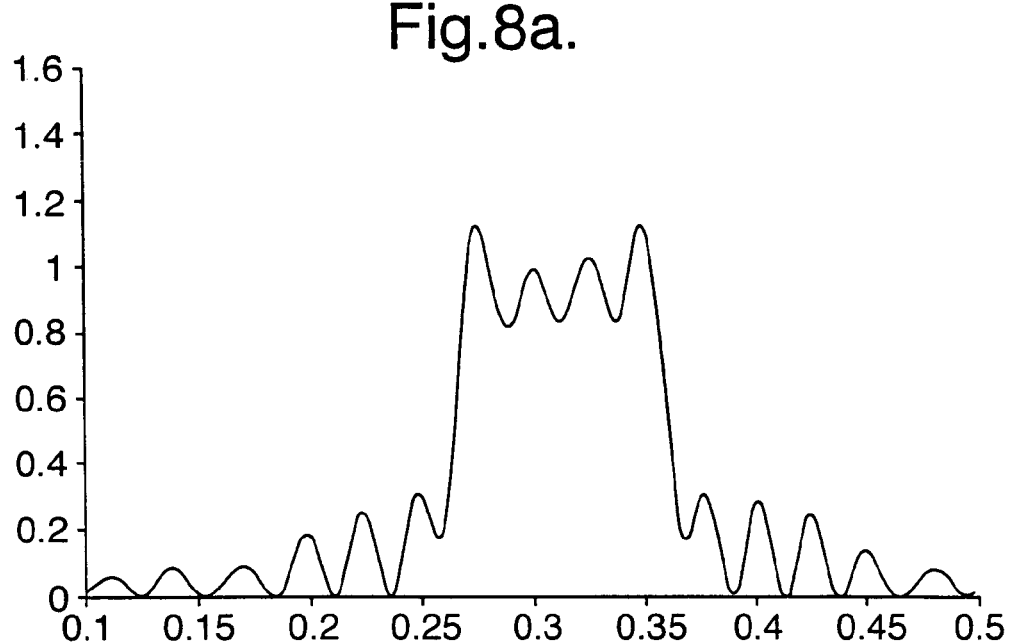
FIG. 8 shows the transmission spectra for a convention photonic crystal structure and for a photonic crystal structure according to the present invention.
Figure 8B:
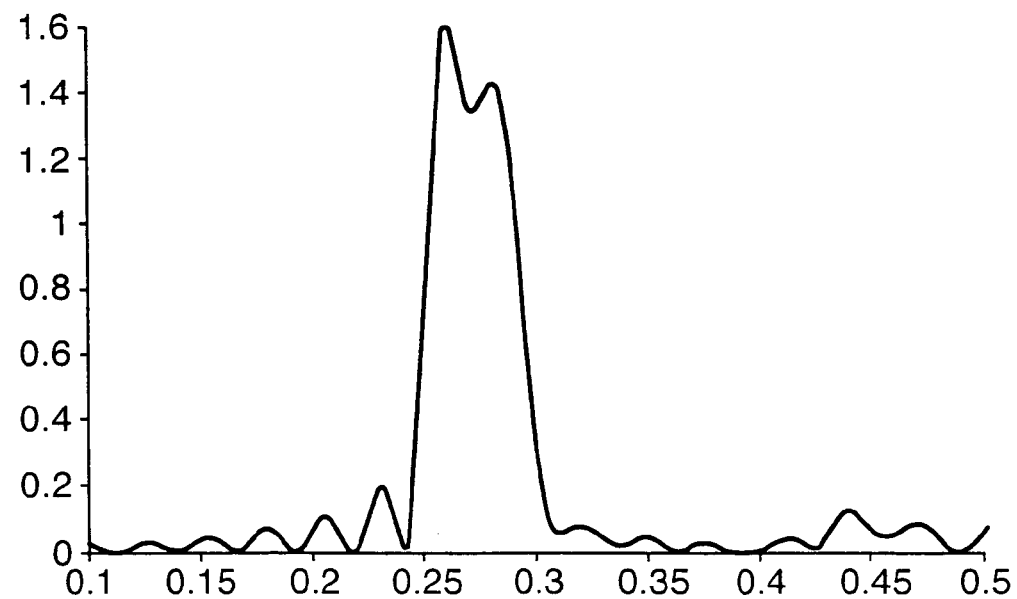

It should be noted that one-dimensional chirped gratings cannot reduce the Fabry-Perot resonances in the long wavelength region, and hence the present invention provides an improved alternative to conventional grating structures. This is very beneficial, especially when drop filters are required, as the transmission characteristics are required to be flat and with minimal dispersion. FIGS. 8A and 8B illustrate the difference in transmission characteristics between a conventional photonic crystal and a photonic crystal according to the present invention. It can be seen that the transmission characteristic of a structure according to the present invention, as shown in FIG. 8B, is much smoother immediately above and below the bandgap as compared with conventional photonic crystal structures.

Alternatively, if intra-row spacing is varied across the array, then very compact and efficient filters can be designed. Each layer diffracts a set of frequencies of light and hence the array can be designed so that only the desired wavelength is reflected or transmitted. This type of array can provide very efficient and compact devices for filtering with minimal cross-talk for applications such as WDM in the telecommunications industry.

Figure 9A:
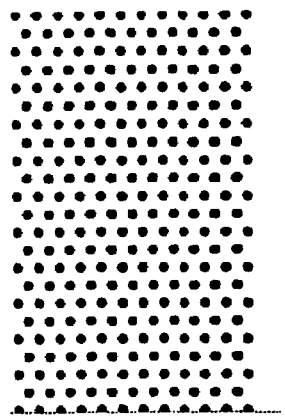
FIG. 9 illustrates dispersion modes made linear across a large bandwidth in a photonic structure according to the present invention.
Figure 9A:
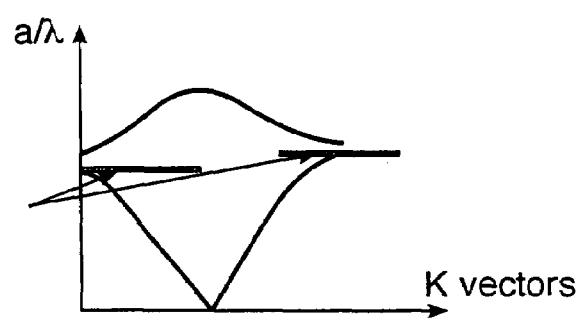
Figure 9B:
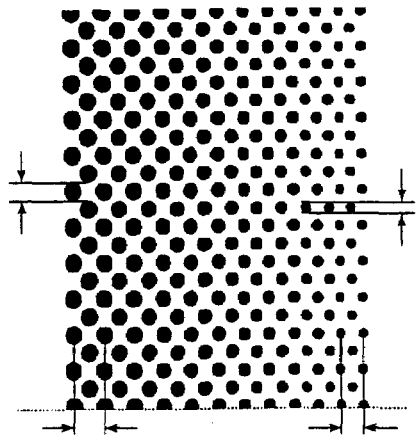
Figure 9B:
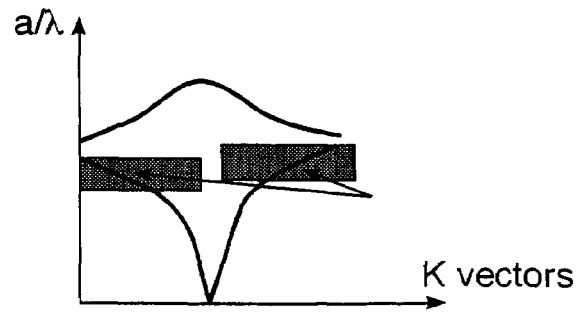

If the inter-row spacing is graded, greater control of the allowed dispersive modes can be achieved, especially around photonic dispersion band edges. As the spacing is varied, each row will provide Bragg reflections due to phase matching is conditions being satisfied for a specific band of wavelengths. When all the weak bandgaps are gradually interleaved, the band edges will vary dramatically compared to a regular two-dimensional photonic crystal lattice. The dispersion along the band edges can be designed to be linear for a large wavelength range, as illustrated in FIG. 9. Another way in which the linearity of the dispersion band edges can be tuned is also illustrated in FIG. 9, which is varying the sub-region thickness across the structure. FIG. 9*a* shows a regular lattice of sub-regions 80, together with an associated band diagram. FIG. 9*b* shows a lattice of sub-regions according to the present invention in which the sub-regions size (width W and thickness T) and the inter-row spacing P is graded across the lattice, together with an associated band diagram. It can be seen that the dispersion bands of FIG. 9b are linear over a much larger wavelength range than the bands of FIG. 9a. Dispersion tuning of this type can be used to provide valuable dispersion compensation for optical communications and in particular WDM systems, that possess flat responses across several channels simultaneously with no distortion in each channel. Additionally, structures of this type could provide dispersion compensation for large bandwidth signals (e.g. for the complete C or L band in the telecommunications window) in a single structure.

Furthermore, dispersion tuning can be used to provide benefits for filtering applications using the super prism effect, in which the reduction of the group velocity of optical signals at the band edge is used to steer light of different wavelengths into different angles. The ability to flatten or tune different regions of the dispersion band can provide less distortion in the signal once is has been steered in this way and more controlled dispersion behaviour. This directly leads to the ability to design photonic structures that are tolerant to fabrication errors so that the trimming of devices after fabrication and problems with low yield are eliminated.

Figure 10A:
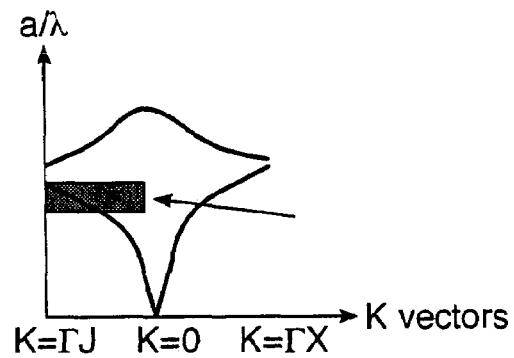
FIG. 10 illustrates how improved tolerances can be achieved using the present invention.
Figure 10B:
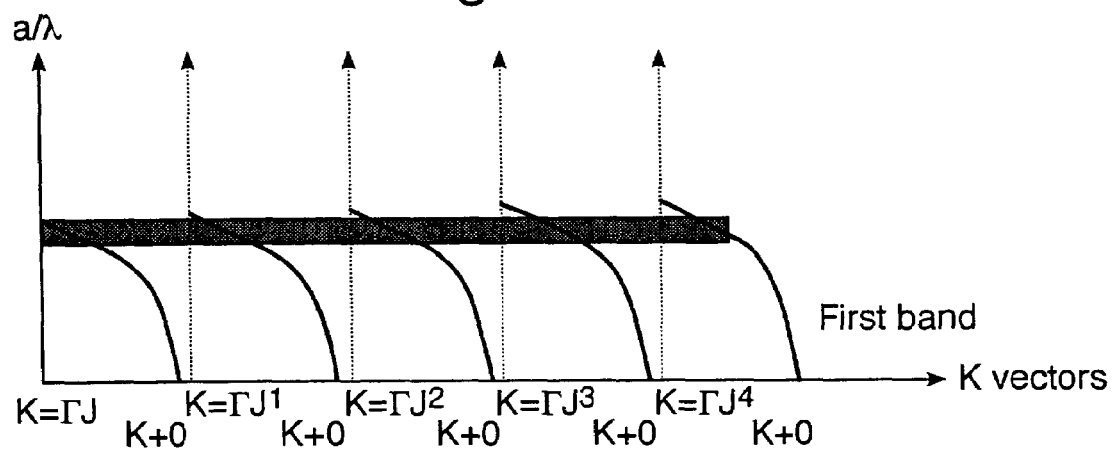
Figure 10C:
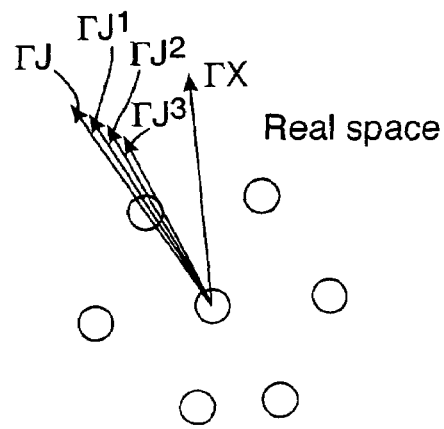

Dispersion tuning can also facilitate the coupling of optical signals into specific modes on the photonic band structure, where slight changes in angle, beam width or alignment tolerances can be accepted. This is illustrated in FIG. 10. It can be seen from FIG. 10a that there is a linear dispersion region for the shown dispersion mode over a band of wavelengths. FIG. 10b shows that this is the case across a range of angles as well. This means that the input angle of optical signals need only be accurate within a certain range in order to couple into that dispersion mode. FIG. 10c shows the angles in real space corresponding to the band diagrams shown in FIG. 9b.

The introduction of point defects, line defects and defect waveguides into photonic structures of the present invention can provide narrow line width defect states, resonant cavities and waveguiding in a versatile way. However, the complexity of the array structures according to the present invention means that even the position of such a defect will affect the characteristic effects of these defects.

Heterostructures can also be formed, in which a mixture of several geometries, at least one of which is in accordance with the present invention, are placed side-by-side. This allows different sections of the structure to perform different processing functions. The different geometries could include different lattices, different lattice orientations or rotation angles. Additionally, different geometries can be superposed to provide Moire like structures. This provides an easy way to introduce defects into the structure to produce narrow line width states.

The fact that there are a large number of parameters that can be altered to affect the photonic response of the array leads to very complex design considerations. The design of photonic crystals according to the present invention therefore lends itself directly to the use of computer optimisation routines, to allow rapid development of the desired objective form of the structure.

Photonic band structures based on dielectric arrays having a particular geometry can be modelled on a computer. The photonic band structure of a two-dimensional array is obtained by solving Maxwell's equation for the dielectric structure in three-dimensions. This is fully described in WO 98/53351, the disclosure of which is incorporated herein by reference. The mathematical method for solving an electromagnetic wave equation can be programmed on a computer. The programming can be designed such that the parameters defining geometry and properties of the array can be altered, to provide new arrays and hence new photonic band structures.

For example, it may be desirable to maximise reflectance between 600 nm and 700 nm and to minimise Fabry-Perot resonances on either side of this reflectance band. This can be thought of as the objective function for the structure. Each photonic band structure modelled by the computer is given a figure of merit in relation to this objective function. In order to model different designs, a basic geometry is chosen as a starting point and a number of parameters defining that geometry are selected, which are to be systematically varied whilst the other parameters remain fixed.

The computer can then perform a large number of simulations by varying the selected parameters to create new designs and can record a figure of merit for each design. This process results in a large sample of possible designs each of which is given a figure of merit. In this way, the designs with the best figure of merit for the objective function can be selected.

Figure 11:
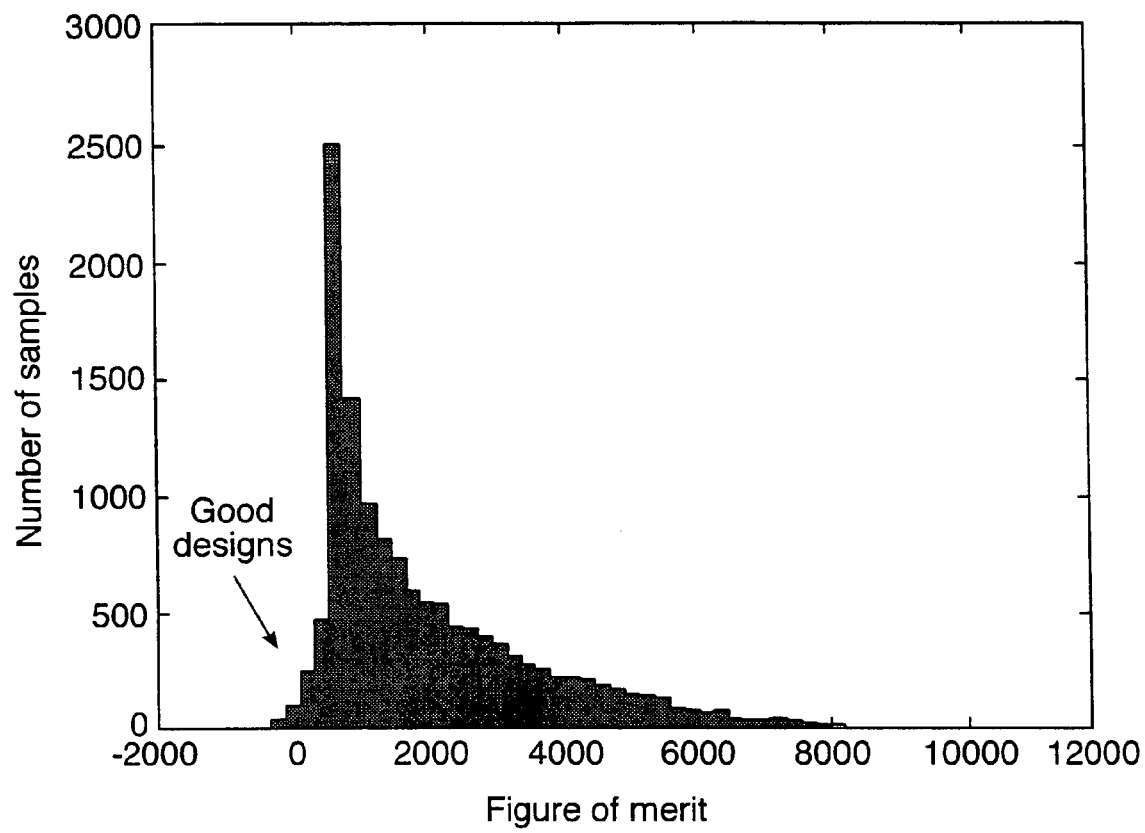
FIG. 11 is a histogram showing the distribution of possible designs against a figure of merit.

FIG. 11 shows a histogram of the objective function for a simulation of this type. Just over 13,000 simulations were performed. The objective function was as described above to maximise reflectance between 600 nm and 700 nm and to minimise Fabry-Perot resonances on either side of this reflectance band. The Y-axis indicates the number of simulations and the X-axis indicates the figure of merit. The lower the figure of merit the better the design. It can be seen that only a small fraction of the simulations yield "good" designs, but it is also true to say that a number of different geometries can be used to achieve the same objective. This is typical of most objective functions.

It is possible to create a plot of "good" designs on a graph with particular parameters as axes. Those areas on the plot with a high density of good designs can be seen and designs in those areas can be chosen to provide high tolerance in the particular parameters.

Having run an optimisation process it is possible to select a "good" design and tune it by re-running the optimisation process with the good design as a starting point but selecting a different parameter or parameters to after.

Once a satisfactory design has been found (and tuned), it is possible to manufacture a photonic crystal structure to that design using conventional techniques, such as lithography. WO 98/53351 again describes how such photonic crystals can be manufactured. The photonic crystal can also be formed as part of a planar waveguide structure in any of the ways described in co-pending applications U.S. application Ser. No. 10/196727, U.S. application Ser. No. 10/287825 and U.S. application Ser. No. 10/421949 all filed by Mesophotonics Limited.

Embodiments of the present invention may be deployed as photonic elements in many different applications. Photonic elements, including those of the present invention, may be implemented in telecommunications systems, in biosensor devices, and in optical storage media.

Figure 12:
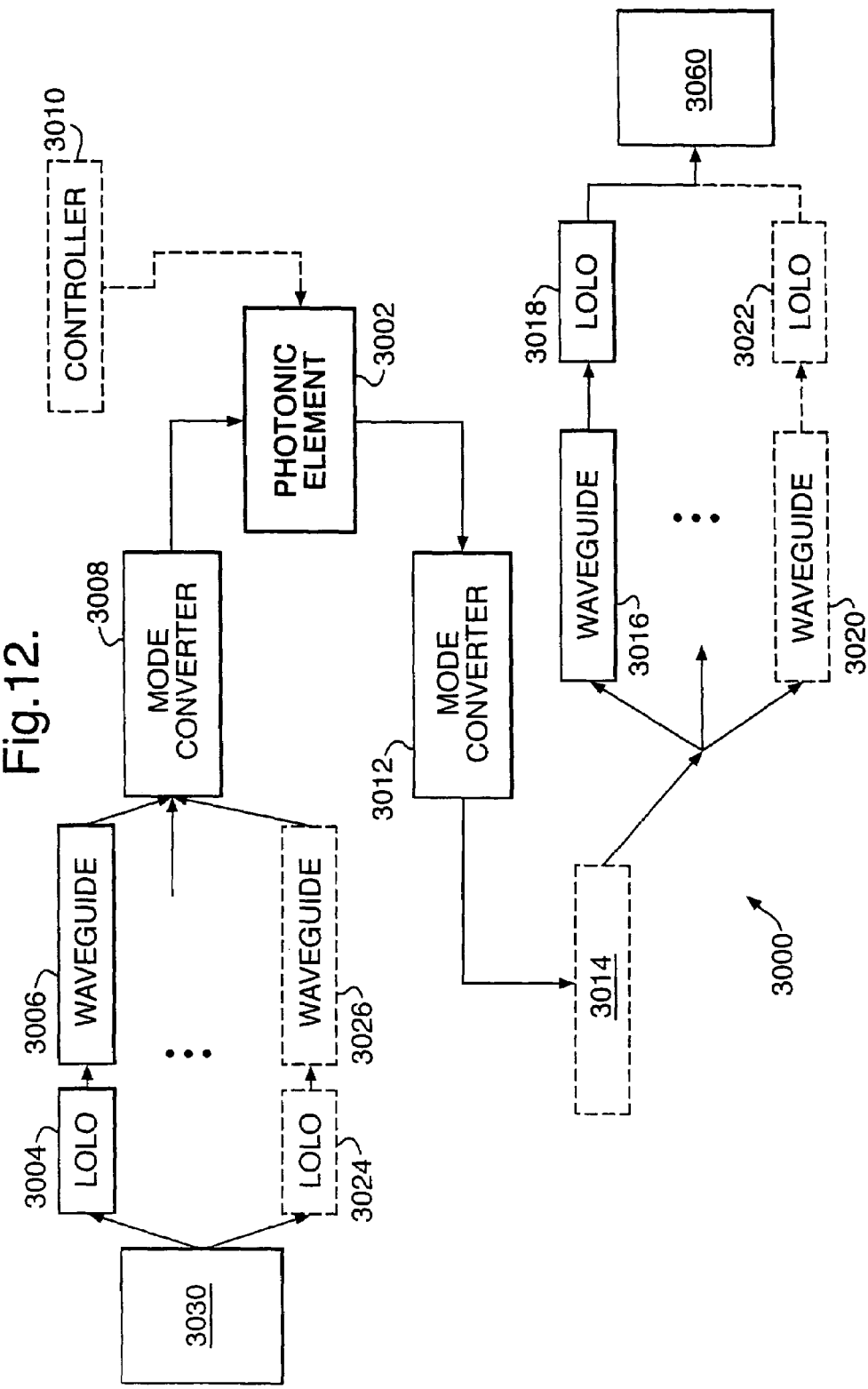
FIGS. 12-14 show photonic devices incorporating a photonic crystal according to the present invention.
Figure 13:
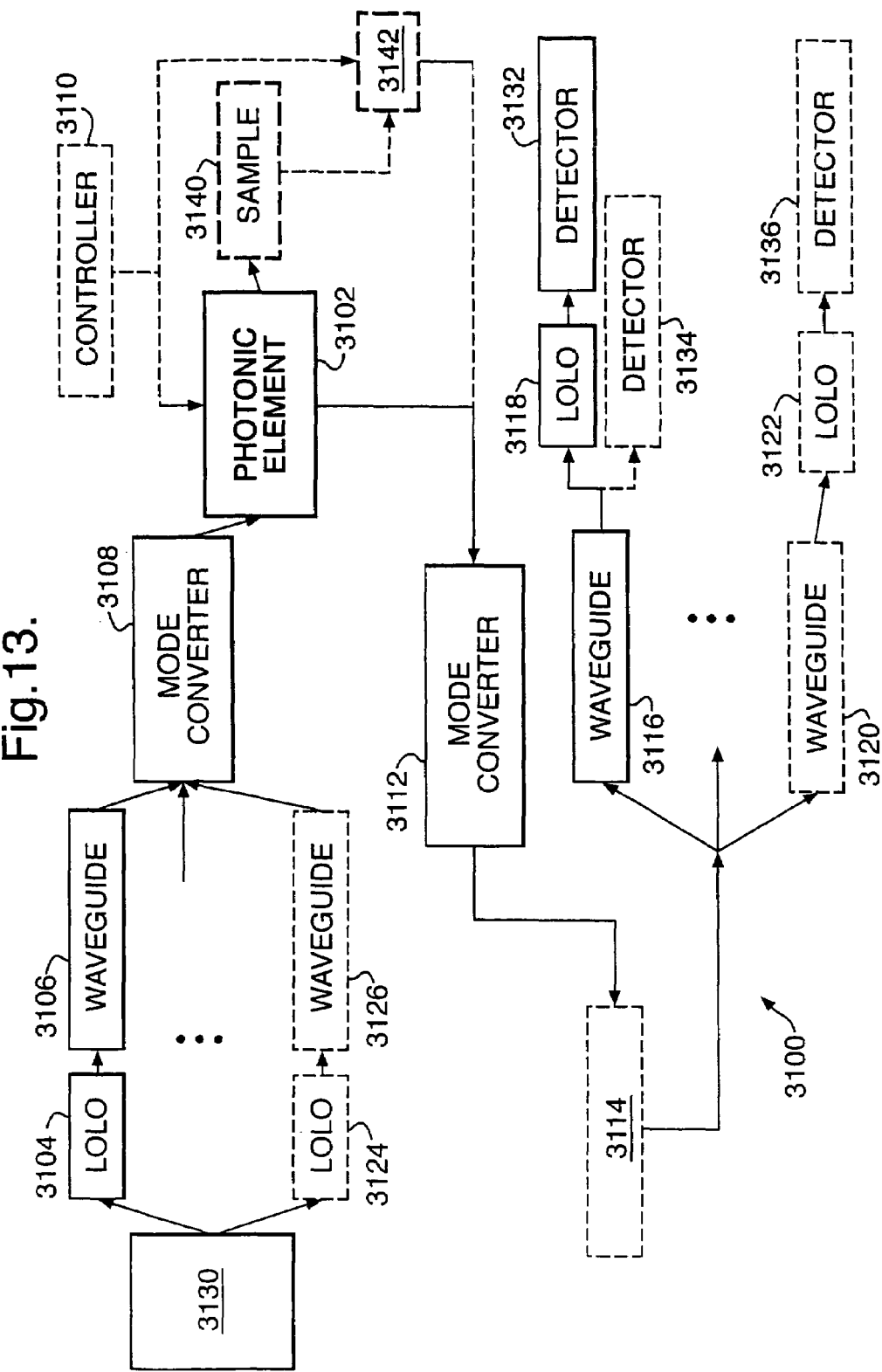
Figure 14:
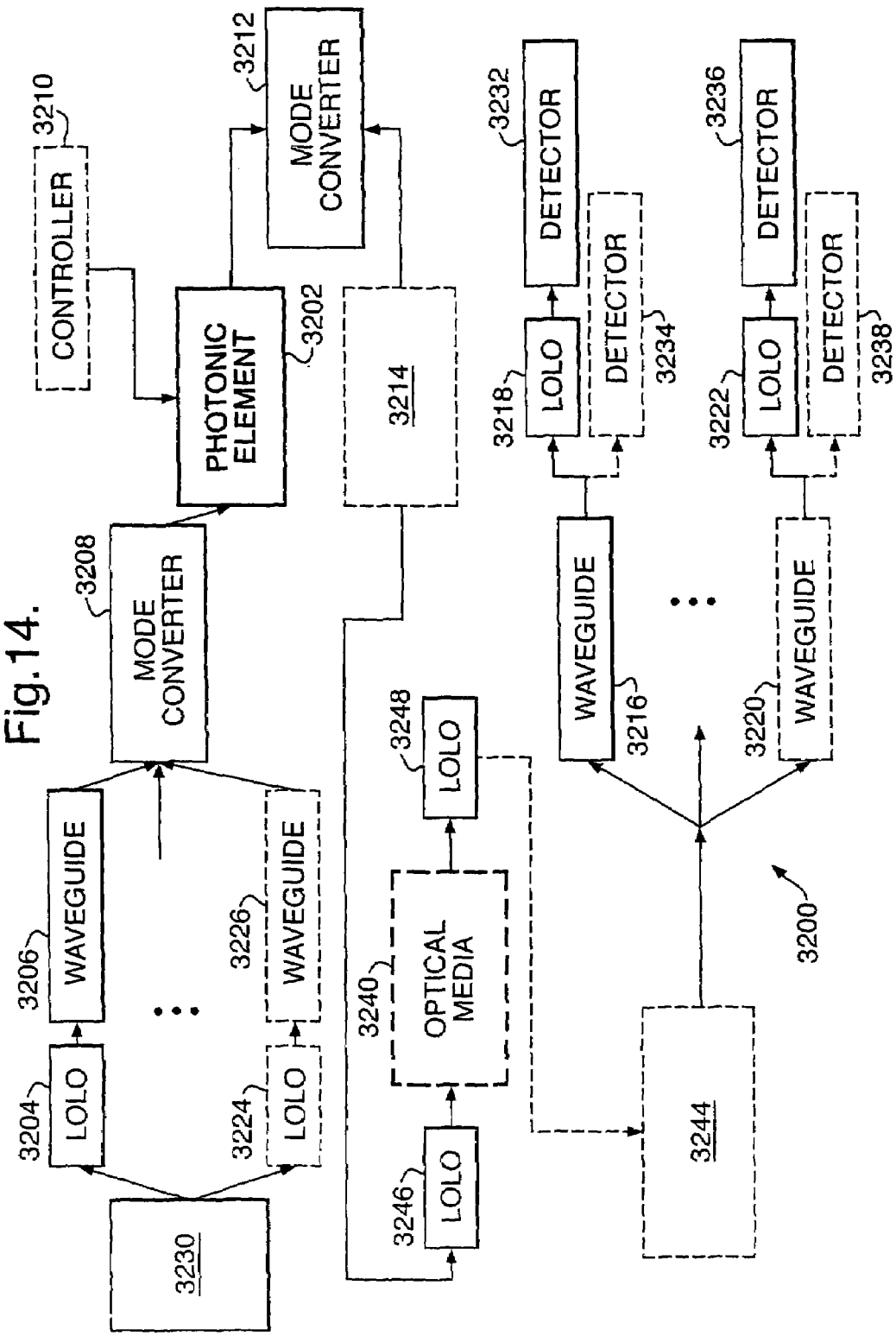

FIG. 12 illustrates the general arrangement of a photonic device 3000 incorporating a photonic element 3002. The illustrated photonic device 3000 is suitable for use in a telecommunications system. A light signal typically propagates along a waveguiding structure 3050, such as an optical fibre. The photonic device 3000 includes: at least one Light On Light Off (LOLO) device 3004, 3024; at least one waveguide element 3006, 3026; a mode converter 3008; the photonic element 3002;

a further mode converter 3012; at least one further waveguide element 3016,3020;

and at least one further LOLO device 3018,3022.

The LOLO device 3004 couples the waveguiding structure 3050 to other components of the photonic device 3000, in the process converting the mode of the telecommunications waveguiding structure 3050 into a planar waveguide mode of smaller cross section that can propagate along the photonic device 3002 with minimal loss. In many cases, several channels need simultaneous processing and multiple fibre inputs are provided.

Following the coupling of light from the external waveguiding structure 3050 to the photonic device 3002, horizontal confinement of the mode is commonly provided by at least one waveguide element 3006. Waveguide elements 3006 such as rib or ridge waveguides are often implemented in high refractive index contrast planar material systems. Other waveguide elements 3006 include waveguide splitters and bends. By means of these waveguide elements 3006 (defect state waveguides, ribs, ridges, splitters and/or bends), light from the LOLO device 3004 is transported from one region of the device to another.

The mode converter 3008 is required to provide efficient coupling of light from the waveguide into the photonic element 3002. Efficient coupling requires attention to appropriate propagation modes and angles in the photonic element 3002, in order to minimise reflections from the interface of the element 3002. Following the conversion of the mode, the light is processed by, and propagates through, the photonic element 3002.

The operation of photonic element 3002 may be altered in a number of ways, including the application of an optical and/or an electrical control signal. The means for altering the operation of the photonic element 3002 is represented in the Figure as an (optional) controller element 3010. Examples of suitable controller elements 3010 include optical control signal sources, electrical control signal sources, and optical pumps, depending on the functionality of the photonic element.

The mode is converted back again into a mode for propagation along the waveguide by the further mode converter 3012. Optionally, additional photonic elements 3014 can be inserted to provide extra functionality and to increase the integration capabilities of the photonic device. Examples of additional photonic elements 3014 may include further waveguide devices and/or splitters.

Finally, at least one further waveguide element 3016 (ribs, ridges, splitters and/or bends) is used to guide the light along to the further LOLO device 3018. In this arrangement, the light is coupled back out into an output waveguiding structure 3060. Multiple waveguide elements 3016,3020 and LOLO devices 3018,3022 can be used for applications such as demultiplexers.

It is further noted that the further waveguide elements 3016,3020 and further LOLO devices 3018,3022 may be one and the same as the LOLO devices 3004,3024 and waveguide elements 3006,3026.

FIG. 31 illustrates the general arrangement of another photonic device 3100 incorporating a photonic element 3102. The illustrated photonic device 3100 is suitable for use in a biosensor arrangement.

The photonic device 3100 includes: at least one Light On Light Off (LOLO) device 3104, 3124; at least one waveguide element 3106, 3126; a mode converter 3108; the photonic element 3102; a further mode converter 3112; at least one further waveguide element 3116,3120; and at least one detector 3136,3134,3132.

Light from a light source 3130, for example a laser or a light emitting device (LED), is launched into the or each waveguide element 3106 via a corresponding LOLO device 3104. The launching of light could simply be end-facet coupling of the light into the waveguide 3106. Again, the waveguide element 3106, may include bends, splitters, ribs and/or ridge structured waveguides. The or each waveguide element 3106 is used to guide incoming light into different regions of the photonic device 3100 where illumination of different samples is performed.

The mode converter 3108 is required to provide efficient coupling of light from the waveguide into the photonic element 3102.

Preferably, the or each photonic element 3102 is itself provided with sample recesses for receiving at least one sample and illumination is performed inside the photonic element 3102. Alternatively, the photonic element 3102 is arranged to launch the light into at least one external biological sample 3140.

Illumination of biological and/or biochemical samples can result in characteristic luminescence properties, for example fluorescence or phosphorescence. In the preferred arrangement, light emitted from the or each sample is then collected at another portion of the photonic element 3102: whereas, in the external sample arrangement, light emitted from the or each sample is collected at another photonic element 3142.

The operation of photonic element 3102, and where present the other photonic element 3142, may be altered in a number of ways, including the application of an optical and/or an electrical control signal. The means for altering the operation of the photonic element 3102,3142 is represented in the Figure as an (optional) controller element 3110. Examples of suitable controller elements 3110 include optical control signal sources, electrical control signal sources, and optical pumps.

Following the collection of the light, the mode is converted into a propagation along the waveguide by the further mode converter 3112. Filtering and possible wavelength separation can then be performed using additional integrated photonic elements 3114.

The processed light signal is then routed around at least one further waveguide element 3116 (ribs, ridges, splitters and/or bends) is used to guide the light along to at least one integrated detector 3134. Processed light may alternatively be routed externally, a further LOLO device 3118,3122 providing the interface with an external detector 3132,3136. Many applications require the use of multiple detectors in order to span a range of different wavelengths, for example Raman Spectroscopy, or in order to distinguish between different samples.

FIG. 32 also illustrates the general arrangement of a photonic device 3200 incorporating a photonic element 3202. The illustrated photonic device 3200 is suitable for use in an optical pick-up unit, such as an optical disc reading head.

The photonic device 3200 includes: at least one Light On Light Off (LOLO) device 3204, 3224; at least one waveguide element 3206, 3226; a mode converter 3208; the photonic element 3202; a further mode converter 3212; at least one further waveguide element 3216,3220; and at least one integrated detector 3234,3238.

Light from a light source 3230, for instance a modulated laser or LED source, is launched into the photonic device 3200 by the LOLO element 3204. Although not illustrated, light can also be coupled into the photonic device 3200 from an external waveguiding structure, such as an optical fibre.

Light from the LOLO element 3204 is coupled into the waveguide element is 3206. The waveguide element 3206, may include bends, splitters, ribs and/or ridge structured waveguides. The or each waveguide element 3206 is used to guide incoming light into different regions of the photonic device 3200.

A mode converter 3208 is required to provide efficient coupling of light from the waveguide element 3206 into the photonic element 3202. The photonic element 3202 processes the light, for example it may serve to filter, compensate for dispersion, focus, align or modulate the incoming light.

The operation of photonic element 3202, and where present the other photonic elements 3214,3244, may be altered in a number of ways, including the application of an optical and/or an electrical control signal. The means for altering the operation of the photonic element 3202,3214, 3244 is represented in the Figure as an (optional) controller element 3210. Examples of suitable controller elements 3210 include optical control signal sources, electrical control signal sources, and optical pumps.

The processed light output by the photonic element 3202 is converted into a mode for propagation along the waveguide by the further mode converter 3212. Filtering and possible wavelength separation can then be performed using additional integrated photonic elements 3214.

The light is propagated into a LOLO element 3246 where the light is focussed onto an optical storage medium 3240. The light is collected back again using another LOLO element 3248 where it is processed again with at least one further integrated photonic element 3244. The further integrated photonic element 3244 includes photonic "building block" elements, for example dispersion compensators, focussing elements, filters and amplifiers.

The processed light from further integrated photonic element 3244 is then coupled to at least one waveguide component 3216 (ribs, ridges, splitters and/or bends) and thereby projected onto a detector 3232,3234,3236,3238 which can either be in the plane of the waveguide or external to the waveguide (hence requiring a LOLO element 3218, 3222).

The invention claimed is:

1. A photonic structure comprising:
    a first region formed from a material having a first refractive index; and
    a two-dimensional array of sub-regions formed in the first region, the sub-regions arranged in rows along a first direction, each sub-region having a refractive index different to the first refractive index;
    wherein the position and properties of each sub-region in the first direction across the array are defined by parameters of a first type which are constant along a row, and the position and properties of each sub-region in a second direction across the array are defined by parameters of a second type, the second direction being different from the first direction; and
    wherein at least one parameter of the first type and at least one parameter of the second type vary monotonically in the second direction across the array, the at least one parameter of a first type varying independently of the at least one parameter of a second type.

2. A photonic structure according to claim 1, wherein at least one parameter of at least one of the first and second type is varied discontinuously in the second direction across the array.

3. A photonic structure according to claim 1, wherein the properties of the sub-regions include size, shape and refractive index.

4. A photonic structure according to claim 1, wherein the photonic structure is part of a planar waveguide structure.

5. A photonic structure according to claim 4, wherein the planar waveguide structure comprises a core layer and a cladding layer, and wherein the array of sub-regions is formed in the core layer or the cladding layer or in both.

6. A photonic structure according to claim 1, wherein the sub-regions each have a refractive index higher than the first refractive index.

7. An optical device comprising:
    an optical input;
    a photonic structure coupled to the optical input; and
    an optical output coupled to the photonic structure;
    wherein the photonic structure is a photonic structure according to any one of the preceding claims.

8. An optical device according to claim 7, wherein the first direction is perpendicular to the second direction, and wherein the optical input and optical output are coupled to the photonic structure so that an optical signal entering the device by way of the optical input propagates through the photonic structure in the second direction to reach the optical output.

9. An optical device according to claim 7, wherein the optical input is coupled to an input facet of the photonic structure and the optical output is coupled to an output facet of the photonic structure, and wherein the input facet and/or the output facet is oblique to the direction of propagation of optical signals passing from the optical input to the optical output.

* * * * *